Sept. 8, 1936.　　　A. I. MACKLER　　　2,053,621
FILM TREATMENT PROCESS
Filed Aug. 6, 1929　　　6 Sheets-Sheet 4
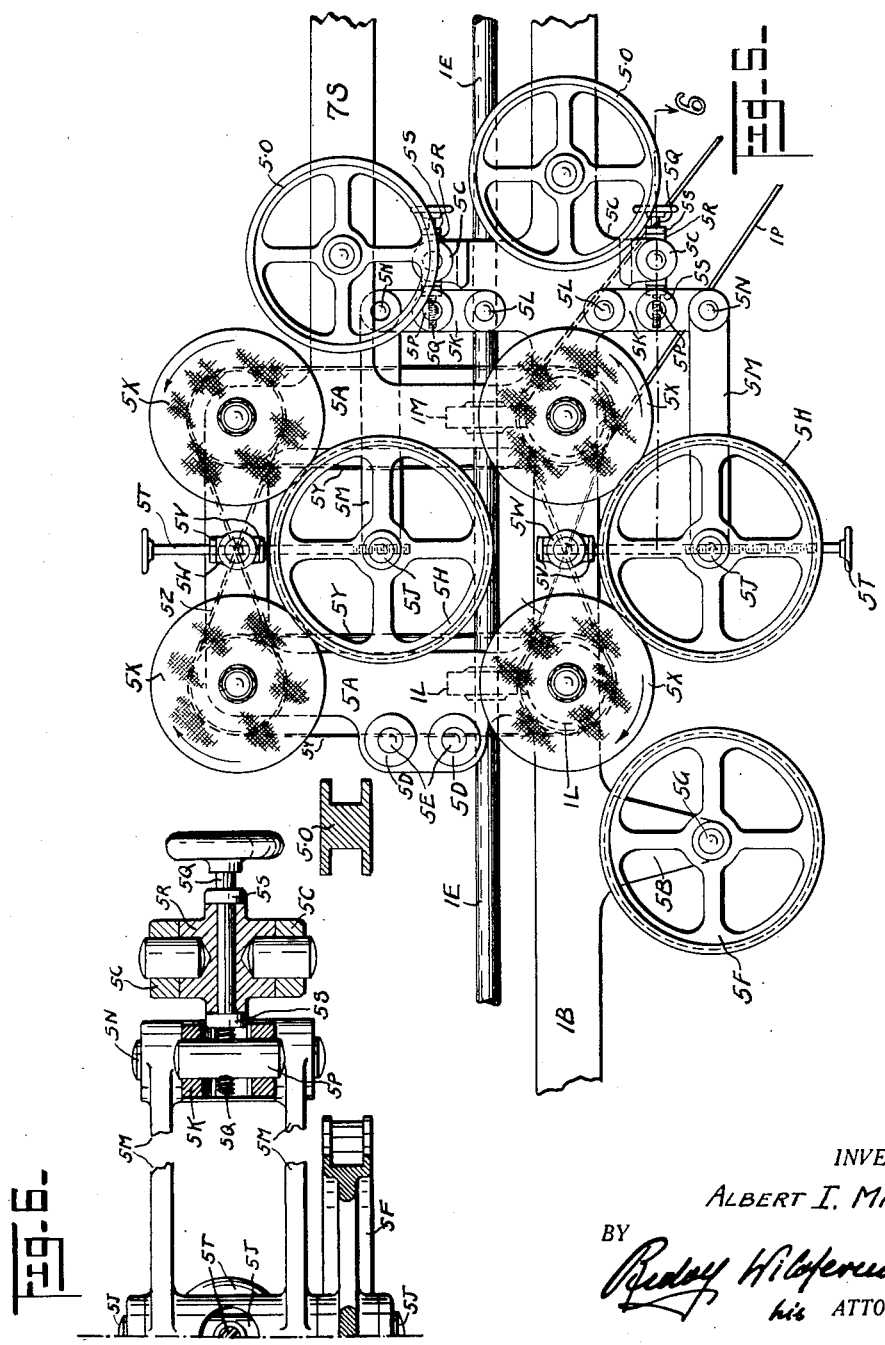
INVENTOR.
ALBERT I. MACKLER
BY
his ATTORNEY.

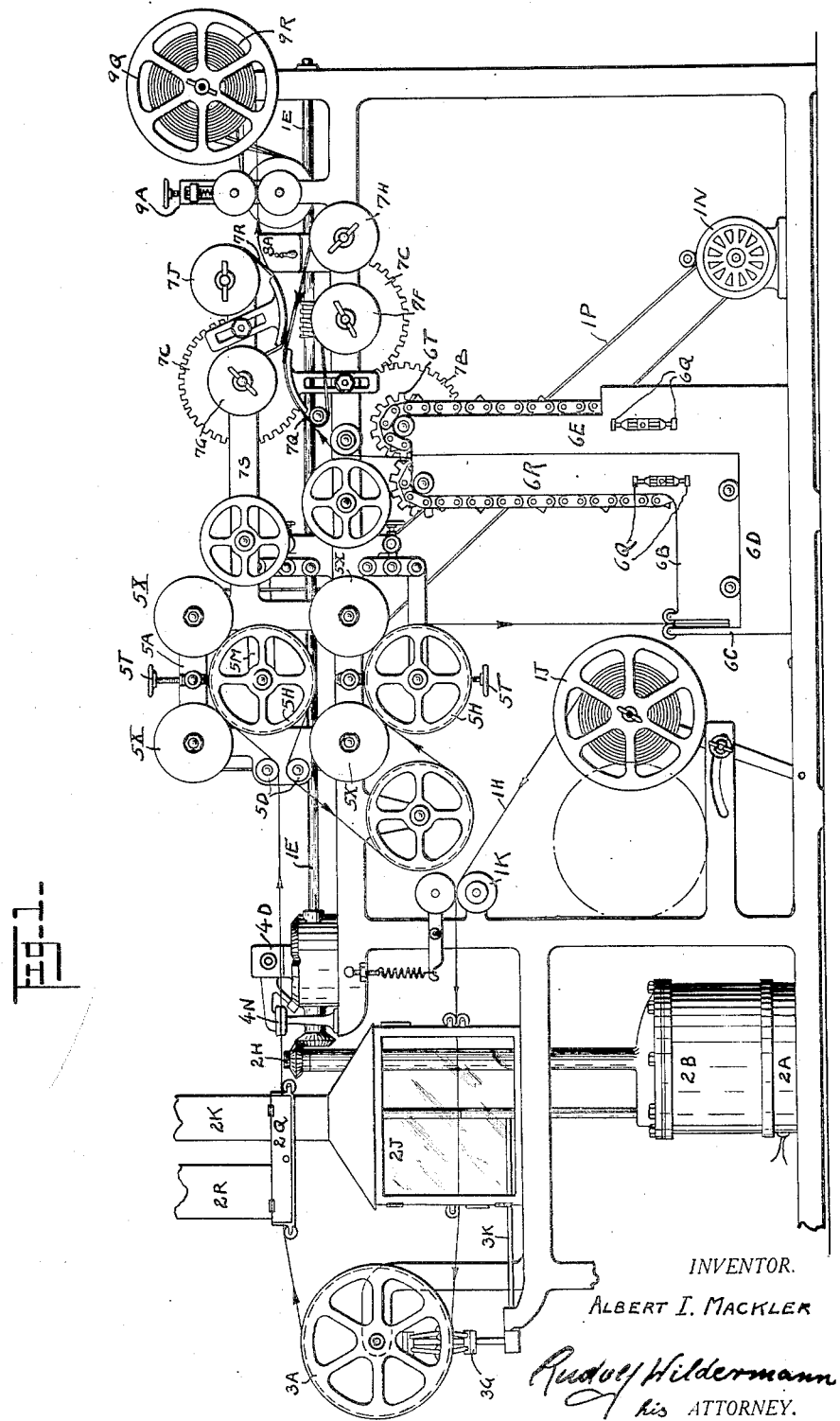

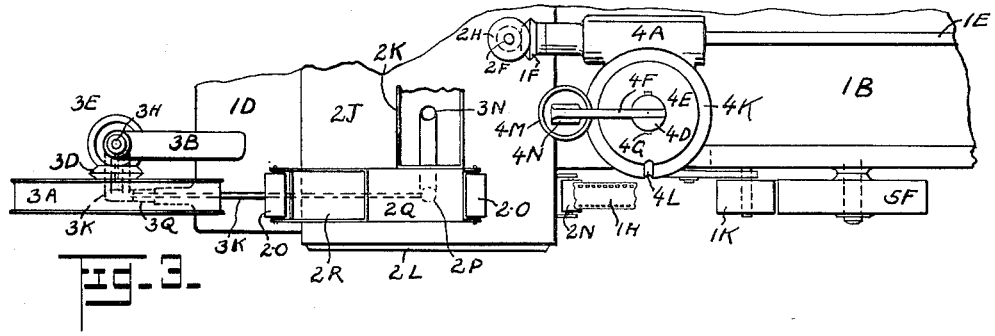
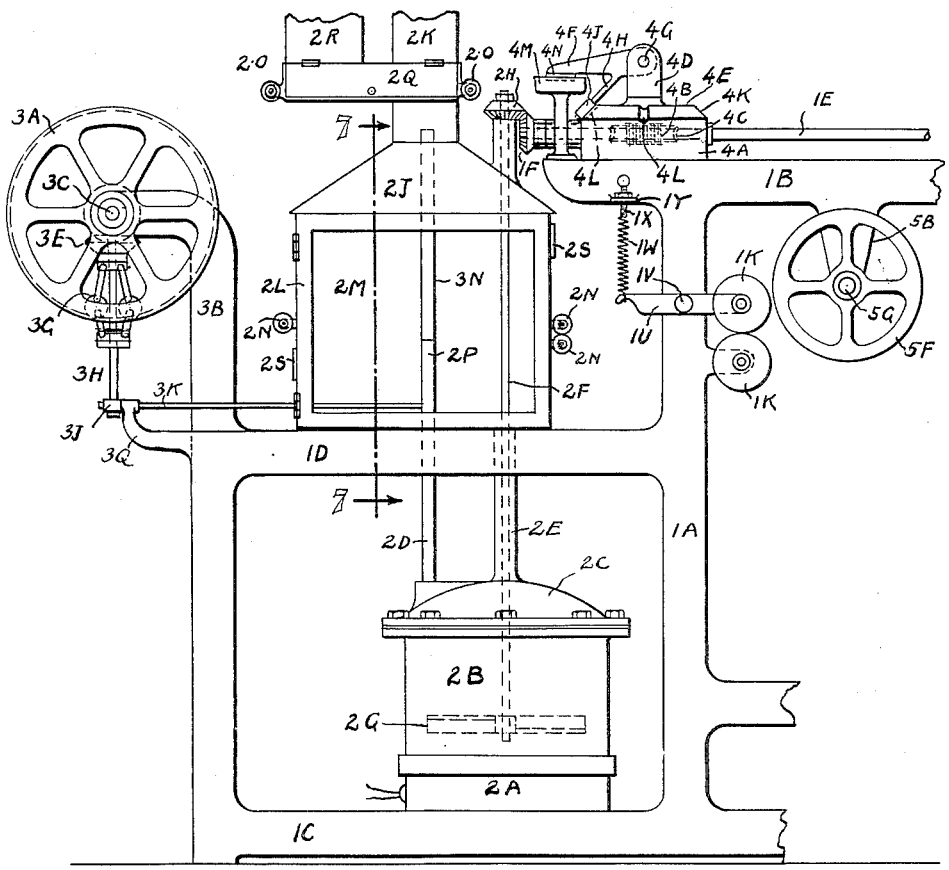

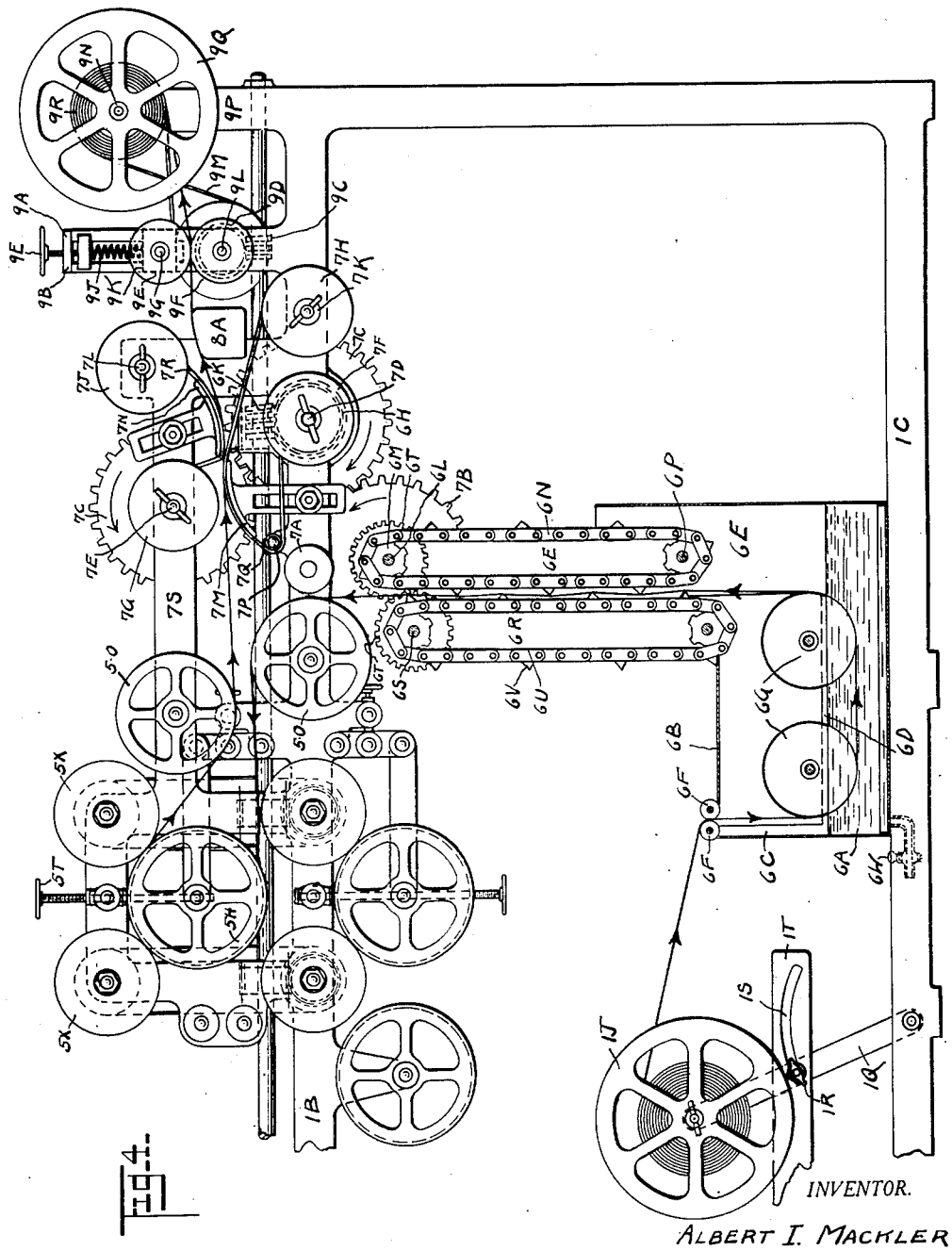

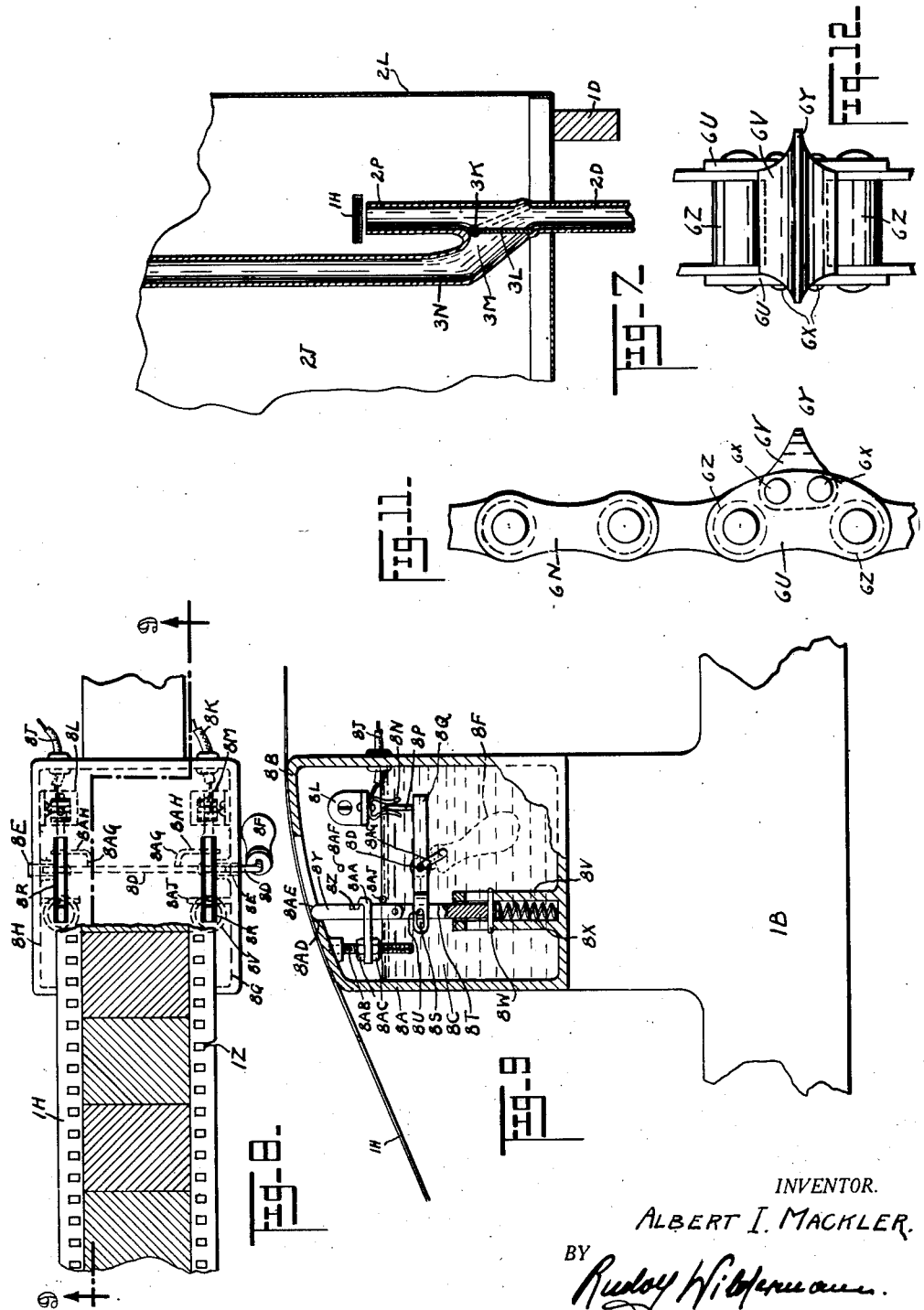

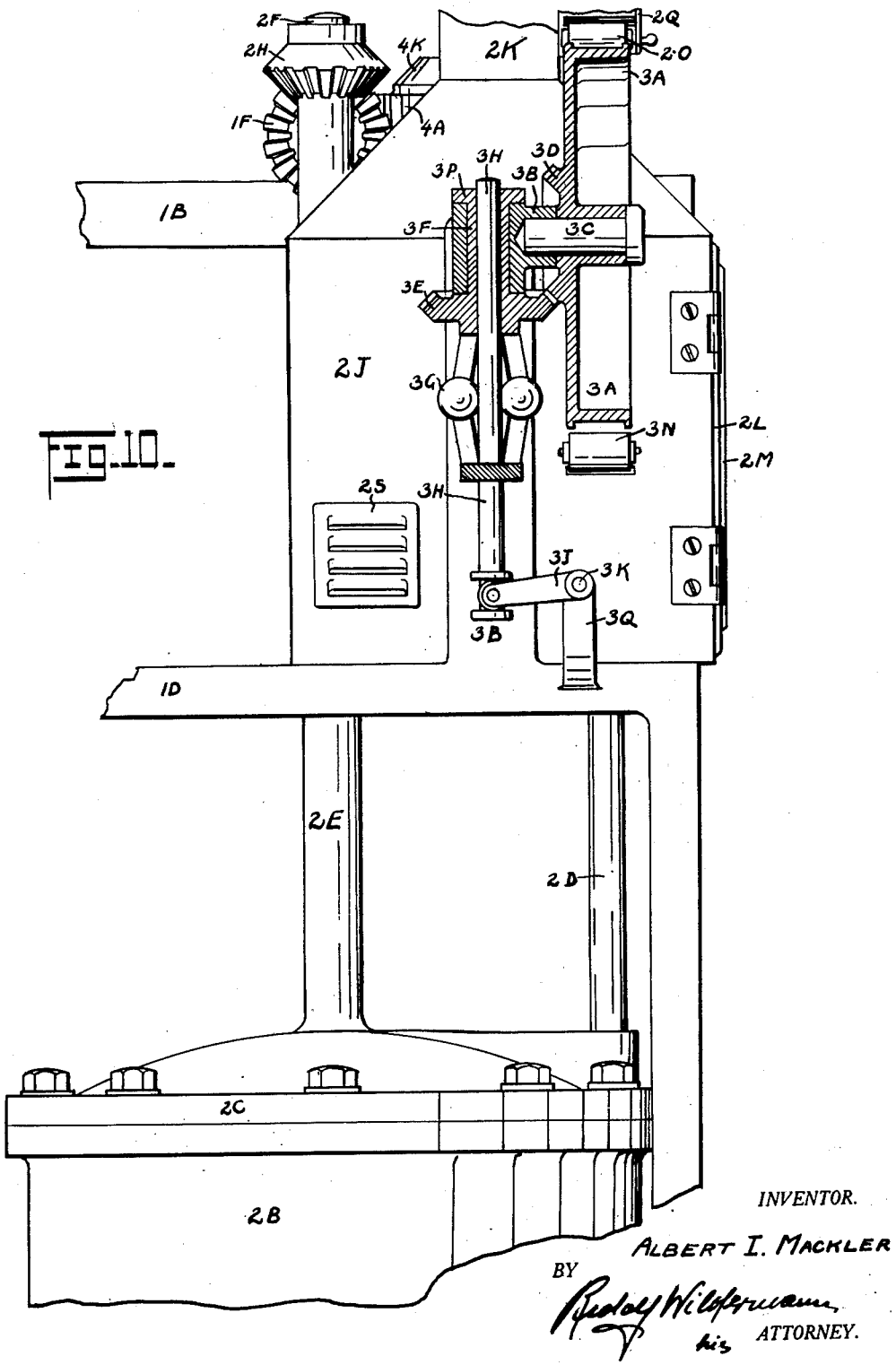

Patented Sept. 8, 1936

2,053,621

UNITED STATES PATENT OFFICE 2,053,621

FILM TREATMENT PROCESS

Albert I. Mackler, Jamaica, N. Y.

Application August 6, 1929, Serial No. 383,965

6 Claims. (Cl. 91—69)

My invention relates to the art of subjecting a film, in particular a moving picture film, to treatments which make it better suited for the rough handling such a film is exposed to, after it leaves the studio, thus preserving its quality and life indefinitely.

My invention in some of its phases improves upon prior methods of treating moving picture films; at the same time I introduce radically new processes, some of the objects of which are, first, a treatment of the surface of the emulsion of the film to make it imprevious for water and oil; second, means for giving the film a vapor treatment which toughens the surface of the emulsion without impairing its flexibility; third, means for applying such treatment, continuously, in an even manner to the whole length of the film; fourth, means for instantaneously stopping such treatment in the event of, and for the duration of an interruption of the processing procedure; fifth, means for applying a filler material, thus leveling the emulsion side of the film; sixth, means for working the filler into the emulsion of the film and polishing the film so as to give it the highest possible gloss on both sides; seventh, a wet buffing process for a moving picture film; eighth, means for buffing a film without scratching or harming it; ninth, means for applying filler materials to a film in specific and suitable quantities, at specific intervals of time, during such a buffing process; tenth, in a buffing process means for preventing the buffing material from flying off the buffing wheels; eleventh, means for buffing a film as it runs through a buffing machine without exerting undue stresses upon the film; twelfth, means for washing a film so as to remove all foreign matter from its surface; thirteenth, means for squeegeeing a film so as to wipe all foreign matter from its surface; fourteenth, means for quickly drying a film after it has been treated or washed so as to prevent the gathering of foreign materials on its wet surface; fifteenth, a means for locating mechanical imperfections in a film; sixteenth, means for removing disagreeable odors from films; seventeenth, means for overcoming the buckling of a film and eighteenth, a processing process for a moving picture film in which the treatment is brought about in a continuous run through a single apparatus.

I use for the processing of films apparatus of the kind illustrated in the accompanying drawings which comprises, first, a frame with a general driving mechanism; second, means for subjecting the emulsion side of the film to a vapor treatment and for cooling the film after said vapor treatment; third, a mechanism for automatically interrupting the vapor treatment when there is an interruption in the whole processing procedure; fourth, a mechanism for daubing the film for the buffing process; fifth, a wet buff; sixth, an apparatus for washing and squeegeeing the film; seventh, means for drying the processed film; eighth, means for mechanically testing the film and for automatically breaking the circuit of the driving motor when there are imperfections; ninth, feed and take-up rolls for the film.

In the drawings:

Figure 1 is an assembly view of the apparatus of my invention seen from the front.

Figure 2 is a front view of a section of my apparatus, showing the parts serving for the vapor treatment, for interrupting said vapor treatment and for daubing the film after the vapor treatment.

Figure 3 is a top view of the apparatus shown in Fig. 2.

Figure 4 shows an assembly view of part of the apparatus of my invention from the front. This view serves to illustrate a modification in the use of my apparatus. The washing apparatus is sectioned in this view.

Figure 5 shows a front view of the buff.

In Figure 6 a lower part of the buff is shown in an enlarged, sectional, sectioned top view.

Figure 7 illustrates, in a sectional, sectioned side view, the piping in the chamber for the vapor treatment and a by-pass used in connection therewith.

Figure 8 is the top view of an electric device which serves to detect flaws and defects in the film and which stops the machine when such a defect is detected.

Figure 9 shows, in a front view corresponding to Figure 8, the sectioned electric device.

Figure 10 is a sectional and partly sectioned side view taken from the left end of the machine, in the direction of the view of Figure 7. It primarily serves to illustrate the mechanism for automatically interrupting the vapor treatment when there is an interruption in the processing procedure.

Figure 11 shows, in a front view, part of the squeegeeing chain together with a special squeegeeing link.

Figure 12 shows a side view of said squeegeeing link.

To facilitate the reading of the drawings, the parts of the apparatus, which are grouped together on each of the eight major component parts of the apparatus as classified above, are referred to by indices, which, generally, numerically correspond with the numerals of those classifications.

Similar combinations of numerals and letters refer to similar parts throughout the various views.

The frame 1A of the machine has an upper level 1B, a lower level 1C and, on its left end, an intermediary level 1D which accommodates the apparatus for the vapor treatment. A main shaft 1E is arranged along substantially the whole length of the top 1B of the machine.

On the lower level 1C, is arranged an electric heating element 2A on which stands the fully enclosed vaporizer 2B, to which heat is supplied from the electric heater 2A. The cover 2C hermetically seals the vaporizer on its top and is arranged so that it can be readily disconnected. A pipe 2D runs upward from an outlet on the cover 2C.

Through a bearing 2E in the center of cover 2C runs a shaft 2F which carries at its lower end, on the inside of the vaporizer, paddles 2G, in the fashion of mixing apparatus, so that rotation of shaft 2F, which is connected by bevel gears 2H and 1F to the main shaft 1E, will thoroughly stir the contents of the vaporizer 2B.

On top of the level 1D is arranged the vapor chamber 2J, to the top of which connects an exhaust duct 2K. It is closed in the front by a door 2L with a transparent window 2M. The chamber is provided with draft regulators 2S. The film 1H reels off a take-off spool 1J, passes between suitable tension rollers 1K and enters upon chamber 2J between guide rollers 2N on the right side of the said chamber and leaves it on the other side guided by a similar roller 2N. Inside of the chamber the film 1H passes over the upper outlet 2P of pipe 2D.

The take-off spool 1J is mounted on a swing bracket 1Q which is fulcrumed at its lower end upon the frame 1A and which may be set at various angles by means of a wing nut 1R on a stud protruding from said swing bracket 1Q through an arcuate slot 1S in an extension 1T on the frame of the machine. Thus the swing bracket may be set to hold the take-off spool in the different positions shown in Figures 1 and 4.

From the take-off spool 1J the film 1H passes over the lower tension roller 1K. The film is tensionally retained on said tension roller by the upper roller 1K which is rotatably mounted on one of the free ends of lever arm 1U. Said lever arm is fulcrumed upon the frame in the stud 1V; onto a hook-like extension on the other free end of the lever arm 1U is fastened the tension spring 1W. That tension spring is fastened to the end of the thumb screw 1X which may be set higher and lower by means of a nut engaged upon its thread and working against a lug 1Y protruding towards the front from the top level 1B of the frame.

Passing around an idler pulley 3A, which is rotatably mounted on a stub shaft 3C extending from a bracket 3B on level 1D, the film runs through box 2Q, being guided at the two ends of the box by guide rollers 2O. This box is provided with suitable perforations on the bottom to allow the entrance of the air which is sucked out of the box through exhaust duct 2R and which cools the film in the said box.

The idler pulley 3A, supported by bracket 3B, idles on the shaft 3C; a bevel gear 3D forms part of pulley 3A and meshes with the bevel gear 3E on the end of a hollow vertical shaft 3F. That hollow shaft is rotatably retained in bracket 3B between the collar 3P on top and the miter gear 3E below and it carries a governor 3G, the lower end of which is hinged upon the shaft 3H, which is slidable in hollow shaft 3F and which is lifted up by centrifugal force when the idler pulley 3A rotates the hollow shaft 3F. The said shaft 3H is operatively connected to the free forked end of lever 3J which is mounted on the end of shaft 3K next to the supporting bracket 3Q. The other end of shaft 3K is journaled in the vertical pipe 2D and it carries a swinging gate 3L which controls the side outlet valve 3M at which a pipe 3N branches off the vertical pipe 2D, a short distance below its upper outlet 2P; the pipe 3N extends up into the exhaust duct 2K.

On the left end of the top level 1B of the table is a worm housing 4A through which extends the main shaft 1E with bevel gear 1F on its end. A worm 4B on shaft 1E meshes, in housing 4A, into a worm wheel 4C. That worm wheel is mounted on a vertical shaft, the upper end 4D of which is enlarged, rests on top of the cover 4E of the housing, and has a vertical slot in which is swingably mounted the lever 4F, fulcrumed in stud 4G. There is an extension 4H on lever 4F, disposed downward, and carrying at its end the roller 4J. When the worm wheel 4C is caused to rotate, driven by the worm 4B on main shaft 1E, the upper end 4D of the shaft on the worm wheel rotates with it, and the roller 4J rolls along the conically disposed edge 4K of the cover 4E of the worm housing. There are two notches 4L in the edge 4K, disposed at right angles in respect to each other, into which the roller 4J, rolling along edge 4K, momentarily drops at regular intervals; this causes a quick downward and return movement of lever 4F at each one of these points. In alignment with the notch 4L which is located above shaft 1E, there is mounted, next to the housing 4A, cup 4M which contains a suitable liquid, into which the pad 4N, attached to the end of lever 4F, is dipped by the above described momentary downward and return movement of lever 4F. If the shaft of the worm wheel rotates in counterclockwise direction, seen from the top, the lever 4F will be disposed towards the front of the machine, a quarter turn after the pad 4N has picked up some liquid from the cup 4M on the left side of housing 4A. The lever momentarily dropping into the notch 4L at the front of the machine, when the lever extends frontward after the said quarter turn, the pad 4N will touch, at the end of said momentary downward stroke, the film 1K, running to the right side of the machine, past that point, after having left box 2Q.

After the film is wetted by the above described daubing mechanism it passes into the buff. The frame work of the buff comprises a bridge 5A above the top level 1B of the table, a bracket 5B below the said level and, on the other side of the buff, small stands 5C above and below the level 1B. Two idler rollers 5D are mounted on bridge 5A, which are rotatable around stationary stud shafts 5E and there are three idler pulleys supported by the frame of the buff, of which pulley 5F is rotatable around the stub shaft 5G on bracket 5B, the idler pulleys 5H being rotatable around similar stub shafts 5J; but the stub shafts 5J are not directly mounted in the frame but means are provided for vertical and horizontal adjustment of these stub shafts in the plane of Figure 5. This adjustment is brought about in the following manner: Levers 5K are hinged upon the frame, in the front, in stub shafts 5L; onto shafts 5N on the free ends of these levers are hinged the levers 5M which in turn carry, in their free ends, the stub shafts 5J. In levers 5K are the rotatable short shafts 5P, tapped holes in which are engaged by adjusting screws 5Q. On the stands 5C are rotatably mounted small hub units 5R, through holes in which pass straight shank sections of the adjusting screws 5Q; these screws are operated by hand wheels on their ends; collars 5S rotatably retain the adjusting screws 5Q in end thrust in the said hub units 5R; if there are right hand threads on the adjusting screws 5Q, clockwise rotation of these screws will pull the levers 5K to the right, whereas left hand rotation will adjust the said levers to the left.

The adjusting screws 5T operate on a principle similar to that of adjusting screws 5Q. Their threads engage tapped holes in shafts 5J, clearance slots being provided for those screws in the hubs on the ends of levers 5M. Straight shank sections of the adjusting screws are retained in rotatable thrust by collars 5V on the hub units 5W which are rotatably mounted on the frame of the machine.

The four buffing wheels 5X are rotatably mounted in the frame, the lower ones being operatively connected to the line shaft 1E by means of the helical gear drives 1L and 1M, the drivers of which, on the main shaft, are hobbed right hand and left hand, respectively.

The lower buffing wheels rotate therefore in opposite directions, the one on the left side rotating counter-clockwise, the one on the right side rotating in clockwise direction, the respective rotations being transmitted to the buffing wheels above by belt drives 5Y. The correlative rotation of the pair of lower and upper buffing wheels is steadied by crossed belts 5Z. One of the lower buffing wheels 5X is driven from the motor 1N by belt or chain 1P.

The two idler pulleys 50 to the right of the buff serve as guide rollers, when the machine is operated as indicated in Figure 4.

The adjustment offered by adjusting screws 5Q and 5T is such that by the adjusting screws 5Q the idler pulleys 5H can be positioned to evenly touch the buffing wheels 5X. After this positioning in a horizontal direction, the adjusting screws 5T will serve to increase or decrease the degree to which the rotating buffing wheels 5X engage said film passing over the idler wheels 5H.

After the buffing operation has been performed the film is washed. The washing apparatus comprises a tank 6A, with drain 6W, which stands on the lower level 1C of the frame. It has a removable cover 6B which closely fits onto the tank, abutting upon the left wall 6C, the side 6D and the vertical extension 6E of said side. The film passes into the tank between two guide rollers 6F, one of which is fastened to the tank, the other one to the cover. The film then passes around to idler wheels 6G, which are rotatably supported in the cover, the lower parts of their circumferences extending downward into the tank. After having passed over the two wheels 6G, the film continues its travel upward, passing over 7A into the drying apparatus. But before the film reaches the roller 7A, it is wiped by the squeegeeing mechanism which functions as follows:

The worm wheel 6H (Figure 4), driven by a worm 6K on the driving shaft 1E, is mounted on shaft 7D. A spur gear 7C, which is also mounted on shaft 7D, meshes into a similar gear 7B on the shaft 6L which is journaled in the upper ends of the vertical extensions 6E of the tank. On shaft 6L is also mounted a sprocket 6M. That sprocket is connected by roller chain 6N to a similar sprocket on shaft 6P below. That shaft 6P is rotatably mounted in the vertical extensions 6E of the sides of the tank, the bearings on said shaft being vertically slidable and held in position by adjusting screws 6Q. The adjusting screws allow the setting of the shaft 6P so as to take up stretching of chain 6N and so as to give that chain the desired tension.

A chain unit substantially similar to the one described above is arranged, slightly lower, on the left side of the film as it moves from the right idler wheel 6G to the idler roller 7A. The sprockets of the left chain unit are mounted in the vertical extension 6R of the cover 6B of the washing apparatus. The lower sprocket shows vertical adjusting means 6Q similar to the ones shown on the right chain unit; the shaft 6S on the upper sprocket of the left chain unit carries on its back end a gear 6T which is driven by a similar gear 6T on the shaft 6L. On the chains of the two units are special links 6U. Between pairs of such links are mounted by rivets 6X the rubber pieces 6V which clear the rollers 6Z and the teeth of sprockets 6M. The free ends 6Y of the pieces 6V extend outwardly, away from the pitch line of the chain so that these rubber pieces slidably engage the film traveling upward from the washing apparatus to roll 7A, the chains traveling slowly downwards on the sides where they slide on the film. Whereas those sections of the chains, which travel downwards, are disposed between the upper sides of the tank and of the cover, the outside sections of said chains, which travel upward, are exposed to the air so that they are dried; this drying may be expedited by suitable fans, arranged to play upon said outer sections of the chains.

Shafts 7D and 7E protrude towards the front of the machine, as arbors, onto which are removably clamped the take-up spools 7F and 7G, respectively. The take-off spools 7H and 7J are of a similar construction and are mounted, under tension, on stationary arbors 7K and 7L, near to and above the level 1B, respectively. Two segments 7M and 7N are adjustably clamped upon the frame of the machine, the first one convex upward and the latter one convex downward. A band 7A of nappy cloth is reeled upon spool 7H and extends from that spool, over the segment 7M, around on idler roller 7P, onto spool 7F. A similar band 7R of nappy cloth passes from spool 7J over segment 7N onto spool 7G. A slow, clockwise motion having been imparted to the shaft 7D by the worm wheel 6H, spools 7F and 7G rotate, in a counterclockwise direction, at a similar speed, owing to the gear train 7B, 7C, 7C; the spools 7F and 7G pull the respective bands of nappy cloth slowly in a direction opposite to the direction in which the film passes over them. It will be noticed that the side of the cloth, which has become wet, is wound onto the take-up spools 7F and 7G facing the center of those spools, so that later on, when they are substituted for spools 7H, the part, which has not been wetted before, will face the film as it subsequently passes over the segments. The arbors and the segments appertaining to the lower band 7A are mounted on the front of the level 1B; those belonging to upper band 7R are mounted on an elbow 7S which extends from bridge 5A to level 1B.

The feeding of the film through the machine is caused by the positive feed rolls 9A mounted on a stand 9B near the right end of the machine. The roller 9F on shaft 9L is driven in clockwise direction by a worm and gear drive 9C, 9D from the main shaft 9E, the film being held onto the roller 9F by an auxiliary roller 9E which is rotatable on shaft 9A. In the manner of power feed arrangements the rollers 9E and 9F may be geared together. The adjustment of the tension of the roller 9E upon roller 9F is caused by the hand screw 9H. By means of this screw the spring 9J is compressed to a greater or to a lesser degree, said spring 9J reacting upon the slide 9K which carries the shaft 9A. A friction drive 9M connects the shaft 9L of the feed roll 9F with the mandrel 9N on the take-up stand 9P; the friction drive allows slipping so that the film is not taken up at a positive speed on take-up spool 9Q, but it winds up on that spool and builds up the reel 9R, at the speed at which it is delivered from the feed rolls 9A.

The electric device 8A, which serves for mechanically testing the film and for automatically breaking the circuit of the driving motor when there are imperfections in the film, is located between the drying apparatus and the feed rolls. It is mounted above the top level 1B in alignment with the film 1H passing through the machine so that the film slides over the curved top 8B of the device 8A. This device is completely enclosed and the operative electrical parts are submersed in the oil 8C which fills the greater part of the device 8A. A shaft 8D extends across the device and is journaled in its walls 8G and 8H in insulating bushings 8E. On its end this shaft 8D carries a handle 8F which is made of insulating material.

The current enters upon and leaves the electric device by means of the conductors 8J and 8K. These conductors connect to the contactors 8L and 8M which are insulatedly mounted on the insides of the walls 8H and 8G, respectively, and which are provided with tension prongs 8N which are suited to receive, in the manner of knife switches, the contact knives 8P. There is a pair of such contact knives 8P, each one of which is mounted on the end of a lever 8Q; these levers are rotatably fulcrumed upon the shaft 8D.

At or near the points, at which the film passing over the top 8B is to be tested for defects, (which is usually near the edge of the film) slots 8R are provided in the top 8B of the electric device. The levers 8Q are in alignment with said slots and their forked ends are provided with elongated holes 8S; between the forks are arranged the vertical rods 8T. These rods 8T are operatively connected to the levers 8Q by the pins 8U which extend from the sides of said rods and which are horizontally slidable in the elongated holes 8S.

The rods 8T are vertically slidable in the hubs 8V which arise from the bottom of the electric device. Their movement in a direction up and down is limited by a pin 8W extending from the rods and adapted to slide up and down in slots in the walls of the hubs 8V. A spring 8X is arranged below the rod 8T, tensioning it upward, so that, normally, the rod 8T is in its highest position; but it is held down in the position shown, by the film 1H, which is pulled over the top 8B to the right.

Onto the upper end of the rod 8T is hinged a lever 8Y. This lever has a catch 8Z on the side, which is adapted to be retained by the hook 8AA which is mounted on a screw 8AB extending downward from the cover 8B. By means of the nuts 8AC the height of the hook 8AA may be adjusted in a vertical direction. The left edge 8AD sideways supports the top end 8AE of the lever 8Y. This top end 8AE is smooth and is of such width and is shaped in such a way that it cannot normally fall through the perforations provided on the side of a film. But when the film is torn and shows a defect, as indicated in the drawing at 1Z, then the lever 8AE, following the upward tension of compression spring 8X, may push the defective part of the film to the side and snap vertically upwards. When the lever 8Y thus moves upwards the catch 8Z slides off the hook 8AA and the film 1H, moving from the left to the right, will swing that lever to the right so that it collapses and comes to rest upon the pin 8AF, out of the way of the film.

The upward movement of the lever 8Y was accompanied by the upward movement of the rod 8T. This caused the lever 8Q, which is operatively connected to the rod 8T by the pin 8U, to swing in clockwise direction. Thus the contact knife 8P is pulled out of the prongs 8N and the current, which heretofore has been flowing from the conductor 8J through the contactor 8L into one of the levers 8Q and from said lever through the rod 8D to the other lever and from there back through the contactor 8M into the contactor 8K, is thereby disconnected at the point of one of the contactors, contactor 8M in this case, because the defect 1Z caused the circuit to be interrupted by the respective contact knife 8P at the front of the machine. The breaking of the current stops the operation of the motor 1N and therefore the machine, since the electric device is either connected directly in series in the motor circuit or since the conductors 8J and 8K connect to an auxiliary relay which in turn controls the circuit of the motor 1N.

Each one of the two levers 8Q represents, together with one of the two sets of parts 8U, 8V, 8W, 8X, 8Y, 8Z, 8AA, 8AB, 8AC, 8AE, 8AF and 8AJ, an independent unit, which, separately, will interrupt the motor current, as soon as actuated.

Before the machine can again be set into operation, the circuit of the electric device must be closed again. This is brought about by operation of the handle 8F. When that handle is swung in counter-clockwise direction, the two hooks 8AG, which extend sideways from said shaft and which by horizontal parts 8AH extend below the levers 8Q, will engage the one of the switch levers 8Q which had been released, or both of them from below and return them into a position of contact, in which the contact knives 8P are reinserted in the contact prongs 8N. The counter-clockwise rotation of the lever 8Q at the same time pulls downward the rod 8T and the lever 8Y is pulled away from the pin 8AF since the pin 8AJ swings it back into its vertical position, and the catch 8Z is again engaged behind the hook 8A, when the rod 8T has reached its lowest position. But the switch will not retain this closed position unless the handle 8F is held in its furthest position to the right and upwards, or unless the film 1H is tensioned again over the cover 8B in such a manner that it holds down the tops 8AE of levers 8Y. However, when switch 8A is thrown in, in the above manner, the machine is started again, the feed rolls pull the film to the right, that pull causes the film to be tensioned over the top 8B, and that tension suffices to hold down the levers 8Y. If one or the other of these levers 8Y is once more released by a defect in the film, after the hand has been removed from handle 8F, the circuit will again be interrupted in the manner described above.

My machine operates as follows:

By means of belt 1P and helical gear drive 1M the power is transmitted from the motor 1N to the line shaft 1E. This line shaft drives, at a fixed speed, the feed rolls 1P, which pull the film 1H through the machine. The film is taken from the spool 1J which is of the type of spools normally used for moving picture films. The film enters upon the tension rolls K which apply sufficient tension to the film to keep it taut while proceeding through the machine and even when the pull on the film slackens; yet they retard the film as little as possible so as to limit to a minimum the degree to which the tensional strength of the film is taxed.

From the tension device the film enters upon the vapor chamber 2J.

For the vapor treatment I use a solution mixed in the following proportion: One gallon of a 40% formaldehyde solution, 5 ounces of a 10% solution of acetic acid esters of glycerol, one ounce of fused camphor, and one pint of water. The formaldehyde serves to toughen the emulsion on the film, the camphor preventing loss of flexibility in the film. For the fusion of the camphor a suitable solvent like trichlorethylene may be used. Any suitable fatty substance of similar qualities may take the place of the acetic acid esters of glycerol, as long as they readily mix with the formaldehyde and are driven off such mixture by heat or suction together with the formaldehyde.

The above solution is placed into the vaporizer 2B; the vaporizer is tightly closed by the cover 2C, the pipe 2D representing the only opening on the vaporizer. Suitable stuffing means prevent the escape of the vapors through the bearing 2E or anywhere along shaft 2F. The arrangement shown in the drawings, according to which shaft 2F passes through the vapor chamber, is a detail of the design which does not have to be followed, if it can be avoided. In fact, I prefer to lead the shaft 2E, from the vaporizer to the bevel drive 1F, 2H, along the side of, or behind the vapor chamber, unless there are some continuously moving parts in the vapor chamber, which are to be operated from shaft 2F. Shaft 2F is rotated by the power transmitted to it through said bevel drive from the main shaft 1E. The paddles 2Q at the lower end of shaft 2F stir up and mix the heterogeneous mixture contained in the vaporizer. By suitable heating means, indicated in the drawings by a heater 2A, the solution in the vaporizer is brought to such a heat as to drive off vapors which ascend through pipe 2D into the vapor chamber.

To replace the liquid in the vaporizer 2B or to clean that container, I loosen the screws or other means which I use to hold the cover 2C tightly upon the vaporizer, I pull up the shaft 2F by lifting the gear 2H, the paddle 2G thus being raised into the hollow dome part on the inside of cover 2C, and then I pull the vaporizer 2B away, sideways, from between the heater 2A and the cover 2C.

When the film 1H is traveling, it imparts movement to the idler pulley 3A and that rotation is transmitted to governor 3G by bevel drive 3D, 3E. By centrifugal force the lower end 3H of the governor is raised and thus the lever 3J is swung in clockwise direction. This clockwise rotation of the lever by means of shaft 3K swings the gate 3L, which normally closes pipe 2P, by passing the vapors into pipe 3N, so as to close the entrance of pipe 3N, the vapors ascending from the vaporizer through pipe 2D, escaping into the vapor chamber through pipe 2P. The open end of pipe 2P is located directly below the film 1H traveling through the vapor chamber. Since it is customary to wind up films on spools with the emulsion side facing the center of the spool, that side of the film is downwardly disposed, when the film travels through the vapor chamber; hence the vapors escaping from 2P strike the moving picture film on the emulsion side, spreading across the whole width of the film. These vapors fill the vapor chamber and are exhausted from it through the exhaust duct 2K. This exhaust system serves primarily to prevent the escape of obnoxious vapors from openings in the sides and bottom of the chamber. The admission of air to the chamber, for the adjustment of the flow of the vapors into the exhaust duct 2K, is regulated by draft regulators 2S arranged on the lower left and upper right side of the chamber. They are built and function on the principle of dampers on stoves. Means for reclaiming the vapors may be introduced into the exhaust duct 2K. The ducts 2K and 2R obtain natural draft from a chimney, forced draft from a suction-fan, or I provide a combination of means for that purpose.

In case the film stops, it is not practical to shut off the vapors ascending from the vaporizer through pipe 2D; on the other hand it is not desirable to have any part of the film exposed for a longer period of time to the vapor treatment. Hence the vapors are diverted from the film in case the motion of the film stops. When the film ceases to travel, idler pulley 2A stops, the governor is released, its lower end 3H drops and swings 3J in a counter-clockwise direction, whereby the gate 3D swings in valve 3M from its position in front of pipe 3N into the normal position, in which it closes the pipe 2P. This diverts the vapors from the film, and they ascend through pipe 3N into the exhaust duct 2K; thus an interruption of the exposure of the film to the vapors is brought about as soon as the film stops in its travel. There are of course a variety of mechanical movements by which the diversion of the vapors may be brought about. I may also use electrical means for that purpose, which operate together with such centrifugal means, or which are actuated by other means registering an interruption of the travel of the film. So for instance the gate may be operated or the pipe 2P may be swung away from the film by the de-energization of an electromagnet which is connected in parallel or series with the motor 1N, the vapors being diverted as soon as, by manual or by the automatic operation of switch 8A, the power causing the travel of the film is shut off.

Upon leaving the vapor chamber the film is cooled off by the outside air. This cooling may be expedited by the cooling box 2Q in which the suction in exhaust duct 2R sucks air onto the film traveling across that box through openings on the bottom of the box. This terminates the vapor treatment of the film, and its travel onto the daubing mechanism.

There is a wide range of variations according to which I can carry through my vapor treatment. As a mechanical modification the whole vaporizer may be rotated to bring about agitation of the fluids. I may introduce suitable agents into the mixture in the vaporizer to cause a ready solution of all ingredients. I may use a series of independent vaporizers for the ingredients of my mixture, the vapors being directed to one point of travel of the film or being applied to the film in succession. Likewise I may dip the film in some of the fluids, playing the vapors of the other ingredients upon the film after it thus has been dipped.

The action of the daubing mechanism, applying by means of pad 4N a liquid to the film, at regular intervals of time and at specified distances along the length of the film, has been described in detail above. Since there is a positive gearing between the feed roll IP and the head 4D, each rotation of which causes the pad 4N to contact once with the film, the application of liquids by the pad to the film may be controlled accurately. The liquid which I apply to the emulsion side of the film by the daubing mechanism is a solution of polishing wax in trichlorethylene to which is added pure mineral oil. Best results have been obtained by the use of a special wax, commercially known in the jewelry trade as "XXX" compound and the mineral oil I use is commercially known as pure Russian mineral oil, which best fulfils the purpose for which I use oil, i. e., to prevent vaporization of the fused wax.

Smoothening and polishing films for the purpose of making the emulsion side less sensitive to injuries is recognized as a valuable means for prolonging the life of a film. But I have succeeded in materially enhancing the value of the buffing operation to such an extent that the emulsion side of the film treated by my process will be as immune to injuries of all kinds as the back of the film. In many respects my process improves upon both sides of the film to such an extent that it is less subject to harm or destruction than the back of a film has been heretofore.

The path of travel of the film through the buffing machine is indicated in Figure 1 and the function of the apparatus is apparent from the description given above. I like to dwell, however, upon particular qualities in my device which make the machine superior in mechanical respects to prior methods. Positive gearing between the lower buffing wheels 5X causes these wheels to rotate at the same speed and the upper buffing wheels at substantially the same speed which is very important for the purpose of preventing undue stresses on the film as it passes through the machine. The means for setting offered by the adjusting screws 5Q and 5T are simple to operate and allow the delicate adjustments necessary to be made by an unskilled worker. The component parts being rugged lever arrangements, they offer a solid, steady support for the buffing operation and are not readily impaired and clogged by foreign matter.

Dry buffing involves many disadvantages which I have overcome by my invention. The surface of the buffing wheels wears down rapidly in dry buffing, requiring continuous attention and adjustments and causing the parts shaved and torn from the buffing wheels to annoy the operator, causing damage by settling in machinery bearings and impairing the health of the operator. But the greatest disadvantage of the dry buffing operation is its effect upon the film itself. The buffing wheel itself will always contain some uneven material which scratches the film and such harm is frequently multiplied by foreign matter settling in the buffing wheels. By my invention I prevent parts of the buffing wheel to enter upon the film and to injure the same. The liquid or paste which I apply to the film serves as a lubricant which prevents such injuries. At the same time that liquid or paste fills all openings, cracks or uneven spaces on the emulsion side and it even smoothens up and out minute scratches or defects on the back of the film. The advantages gained by my improvements are therefore twofold; first, injury by the buffing process itself is prevented, and second, imperfections in the film are removed since a filler is worked into the film by my wet process.

The daubing mechanism shown is of course demonstrative only and a great variety of methods suggest themselves for wetting the film before it is buffed. They may be divided into two classes, one of which comprises the methods applying the liquid or paste to the film. The method which I have illustrated in the drawings falls into that class. It may be substituted by an application of the liquid or paste by a dispenser from which drops of fixed quantities of the liquid or paste fall at regular intervals onto the emulsion side of the film; I can also apply the liquid or paste by a fine spray. The other class of means to bring about the wetting involves the application of the liquid or paste to the first buffing wheel or to two of the buffing wheels. The methods for such application are similar to the ones used for applying the liquid or paste to the film.

Leaving the buff over idler pulley 5H the film enters the washing tank. The washing liquid is filled into the tank up to a point near the upper edge of the sides 6D, below the shafts of the idler pulleys 6G; waste cock 6W serves for draining the used liquid when the contents of the tank are to be renewed.

I choose for the cleaning and washing operation a liquid composed of the following parts: 75 parts of trichlorethylene, 25 parts of alcohol, one part of water, a minute part of glycerin and a minute part of an essential oil. Considerable variations in proportioning this liquid are of course possible. The use of glycerin is arbitrary as to quantity; the quantity of an essential oil to be added depends on the concentration and strength of that oil. The purpose of the oil is to soften the rank smell which has been given to the film by the processing; oil of wintergreen and also citronella have been found cheap and effective oils for that purpose.

To place the film into the tank I lift the cover 6B from the tank and carry the film around the idler pulleys 6G fastened upon said cover and up to the idler roller 7A on the side of the upper level of the machine. Then I replace the cover on the tank, the idler pulleys 6G being submerged in the liquid in the tank and the gear 6T, which serves to drive the left chain, mounted on the cover, being brought into mesh with gear 6T on shaft 6L.

The film will extend between the roller 6G and 7A in a zig-zag line around the rubber lugs 6V, which extend from the two endless chains on the sides, upon which they face each other. The speed of the downward travel of the chains is of course very slow compared to the speed at which the film travels up. It is governed by the question, how often the rubber lugs are to be dried, in other words, how far the drying process is to be carried by squeegeeing. My novel squeegeeing process serves to deliver the film to the drying apparatus in a uniformly wiped state, all foreign matter having been removed.

Similar to the slow speed of travel of the rubber lugs 6V in a direction opposed to the travel of the film during the squeegeeing operation, the nappy cloth bands 7Q and 7R, traveling from the right to the left above and below segments 7M and 7N, respectively, move slowly in a direction opposed to that of the travel of the film. The nappy cloth bands, traveling over 7M and 7N, dry the bottom and the top, respectively, of the film, the film being pressed in a wiping action onto the nappy cloths by tension exerted by the feed rolls 9A, pulling the film through the machine. The nappy cloth bands having a limited length, the take-off and take-up spools are reversed after the length of the cloth has been pulled past the film.

The film tester, arranged in combination with a circuit-breaker, which controls the current operating the driving motor IN in the electric device 8A, functions as follows: The film, when inserted into the machine is pulled through the feed rolls 9A and is clamped in those feed rolls under tension, so that it is strapped across the top 8B of box 8A. Now I swing lever 8F in a counterclockwise direction, the switch being thrown in thereby. The motor will drive the feed rolls and the tension of the film will hold down the tips 8AE of levers 8Y, so that the catches 8Z on these levers are engaged by the hooks 8AA. The levers are thus retained in their lowest position keeping the switch closed. When the operator lets go the lever 8F, it drops back into its normal position, downward, but the switch stays closed as long as the film remains tautly extended over cover 8B. If there are imperfections in the perforations of the film, one of the tips 8AE will slip through that imperfect part of the film, upward, open up the switch and the motor is stopped. If the motor is to be stopped while the film is tightly extending across the housing 8A, the handle 8F is swung by manual operation in clockwise direction, the hooks 8AG engaging levers 8Q to the left of rod 8D and rotating said levers in clockwise direction, so that the knives 8P slip out of the prongs 8N and the motor current is interrupted.

The ends 8AE of levers 8Y may be given a variety of shapes according to the size and extent of the imperfections in the perforations of the film they are to react upon; and they may slide on the film wherever a defect is to be located. The use of two devices 8A in rotation, may also suggest itself, the tips 8AG of one of them being adapted to snap up through ruptures connecting adjoining perforations of the film, the fingers on the other device snapping up when the film is imperfect due to ruptures extending from the perforations to the nearest edge of the film (8Z).

Once a film has been given my vapor treatment the emulsion side will preserve the toughness it has gained thereby for an unlimited period of time. But it may be desirable to clean such a film later on and to again subject it to a polishing process such as given by my buff. When I desire to thus recondition a film which has been processed at a prior occasion, or if I desire to polish and wash a film, without subjecting it to the chemical processes, I use my machine in the manner indicated in Figure 4.

The position of the take-off bracket IQ is adjusted to such a position that the film may pass from a take-off spool mounted thereon directly into the washing tank. The film passes through the washing tank in the same manner as described before. But after the squeegeeing it passes over the auxiliary pulley 5O to the left, in clockwise rotation around the upper pulley 5H on which it is submitted to the polishing action of the two upper buffs 5X. From the buff the film passes around the upper auxiliary pulley 5O to the right, over the two nappy cloth bands where it is wiped off and completely dried. Then it passes over the electric device 8A where it is tested for defects and then through the feed rolls 9A onto the take-up spool.

I have shown, described and explained one form of embodiment of my invention; but I do not wish to be limited thereby, except to the extent of the present state of the art and the appended claims, for it is obvious that many modifications and changes may be made in the methods which form the substance and embodiment of my improvements, without departing from the true spirit and scope thereof.

I claim:

1. In a film treatment process the treatment of the emulsion side of the film with a mixture of camphor and formaldehyde.

2. In a film treatment process the treatment of the emulsion side of the film with a fatty mixture of camphor and formaldehyde.

3. In a film treatment process the treatment of the emulsion side of the film with vapors of camphor and formaldehyde.

4. In a film treatment process the exposure of the emulsion side of the film to vapors driven off a mixture comprising formaldehyde and fused camphor.

5. A film treatment fluid, comprising one gallon of a 40% formaldehyde solution, five ounces of a fatty solution, one ounce of camphor, and water.

6. A film treatment fluid, comprising solutions of formaldehyde, a fatty substance, and camphor.

ALBERT I. MACKLER.